United States Patent
Dejneka (10) Patent No.: US 10,612,768 B2
(45) Date of Patent: *Apr. 7, 2020

(54) COLOR CHANGING COVER FOR AN ELECTRONIC DEVICE

(71) Applicant: CORNING INCORPORATED, Corning, NY (US)

(72) Inventor: Matthew John Dejneka, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,665

(22) Filed: Feb. 4, 2019

(65) Prior Publication Data

US 2019/0170342 A1 Jun. 6, 2019

Related U.S. Application Data (63) Continuation of application No. 14/711,073, filed on May 13, 2015, now Pat. No. 10,197,264.
(Continued)

(51) Int. Cl.
*F21V 8/00* (2006.01)
*H04M 1/02* (2006.01)
(Continued)

(52) U.S. Cl.
CPC .......... *F21V 33/0052* (2013.01); *F21V 5/006* (2013.01); *F21V 7/0075* (2013.01);
(Continued)

(58) Field of Classification Search
CPC ........ F21V 5/006; F21V 7/005; F21V 7/0075; F21V 33/0052; H04M 1/0283; H04M 1/22
See application file for complete search history.

(56) References Cited

U.S. PATENT DOCUMENTS 7,336,980 B1    2/2008  Kaikuranta et al.
7,766,511 B2*   8/2010  Zampini ............... F21S 2/00
                                           362/294
(Continued)

FOREIGN PATENT DOCUMENTS

CN    101969503 A    2/2011
CN    102176728 A    9/2011
(Continued)

OTHER PUBLICATIONS

International Search Report of the International Searching Authority; PCT/US2015/032937; dated Sep. 23, 2015; 4 Pages; European Patent Office.
(Continued)

*Primary Examiner* — William N Harris
(74) *Attorney, Agent, or Firm* — Kevin M. Johnson (57) ABSTRACT

A color changing cover device for an electronic device includes a translucent cover component appearing white when not illuminated and having a shape adapted to cover a select portion of the electronic device, a direct transmission of less than 10%, and a diffuse transmission of less than 1%. A backlight component is arranged to illuminate the translucent cover component from a back surface of the translucent cover component. The backlight component is configured to provide at least two individually addressable colored lights with different spectral output.

20 Claims, 8 Drawing Sheets

Related U.S. Application Data (60) Provisional application No. 62/005,345, filed on May 30, 2014.

(51) Int. Cl.
    *H04M 1/22*     (2006.01)
    *F21V 33/00*     (2006.01)
    *F21V 7/00*     (2006.01)
    *F21V 7/05*     (2006.01)
    *F21V 5/00*     (2018.01)
    *H04B 1/3888*     (2015.01)

(52) U.S. Cl.
    CPC .............. *F21V 7/05* (2013.01); *G02B 6/0068* (2013.01); *H04M 1/0283* (2013.01); *H04M 1/22* (2013.01); *H04B 1/3888* (2013.01)

(56) References Cited

U.S. PATENT DOCUMENTS

| | | | |
|---|---|---|---|
| 8,496,361 B2 | 7/2013 | Watanabe et al. | |
| 8,523,393 B2 * | 9/2013 | Dong Soo | F21S 8/02 362/249.02 |
| 8,675,146 B2 | 3/2014 | Kuroki | |
| 9,057,493 B2 * | 6/2015 | Simon | F21V 7/0008 |
| 9,285,084 B2 * | 3/2016 | Amrine, Jr. | F21V 3/02 |
| 2003/0161154 A1 | 8/2003 | Ouyang et al. | |
| 2006/0050509 A9 | 3/2006 | Dowling et al. | |
| 2007/0035739 A1 | 2/2007 | Tung | |
| 2008/0192500 A1 | 8/2008 | Kaito | |
| 2009/0135680 A1 | 5/2009 | Rosales | |
| 2009/0231249 A1 | 9/2009 | Wang et al. | |
| 2010/0079996 A1 | 4/2010 | Shon et al. | |
| 2014/0087194 A1 | 3/2014 | Dejneka et al. | |
| 2016/0109779 A1 | 4/2016 | Ke et al. | |

FOREIGN PATENT DOCUMENTS

| | | |
|---|---|---|
| CN | 201985932 U | 9/2011 |
| JP | 2001268195 A | 9/2001 |
| JP | 2003151337 A | 5/2003 |
| JP | 2008185604 A | 8/2008 |
| JP | 2010199763 A | 9/2010 |
| JP | 5383101 B2 | 1/2014 |
| KR | 2010134926 A | 12/2010 |

OTHER PUBLICATIONS

TW104117459 Search Report and Office Action dated Feb. 12, 2019, Taiwan Patent Office.

Taiwanese Patent Application No. 104117459; Office Action and Search Report dated Aug. 2, 2019; Taiwan Patent Office; 2 Pgs.

Japanese Patent Application No. 2016569996; Machine Translation of the Office Action dated Jul. 31, 2019; 12 Pgs; Japan Patent Office.

Chinese Patent Application No. 201580041385.9; English Translation of the Second Office Action dated Oct. 22, 2019; China Patent Office; 9 Pgs.

\* cited by examiner

COLOR CHANGING COVER FOR AN ELECTRONIC DEVICE

CROSS-REFERENCE TO RELATED APPLICATIONS

This application is a continuation of Ser. No. 14/711,073 filed on May 13, 2015, which claims the benefit of U.S. Provisional Application No. 62/005,345 filed May 30, 2014, the disclosure of which is incorporated herein by reference.

BACKGROUND

The ability to dynamically change the colors of electronic devices will enable a new array of personalized electronic devices that can provide additional function, such as responding to the whims of users or changes in the environment of the user. Thus there is a desire to provide electronic devices with such color changing capability without greatly increasing the size and power consumption of the electronic device.

SUMMARY

Color changing cover devices for use with electronic devices are disclosed herein.

In one illustrative embodiment, a color changing cover device for an electronic device comprises a translucent cover component appearing white when not illuminated and having a shape adapted to cover a select portion, such as one or more sides, of the electronic device. The translucent cover component has a direct transmission of less than 10% and a diffuse transmission of greater than 1%. The color changing cover device also includes a backlight component arranged to illuminate the translucent cover component from a back surface of the translucent cover component. The backlight component is configured to provide at least two individually addressable colored lights with different spectral output.

The color changing cover can be mounted on an electronic device so as to cover a select portion of the electronic device, with appropriate connections made between the power and control units of the electronic device and the backlight component of the color changing cover device. This will allow the illumination color of the translucent cover component to be changed dynamically, for example, according to user preferences specified through the electronic device. The colored lights provided by the backlight component can be selected such that there is virtually no limit to the visible color that the translucent cover component can have when illuminated.

It is to be understood that both the foregoing summary and the following detailed description are exemplary. The accompanying drawings are included to provide a further understanding of the embodiments and are incorporated in and constitute a part of this disclosure.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
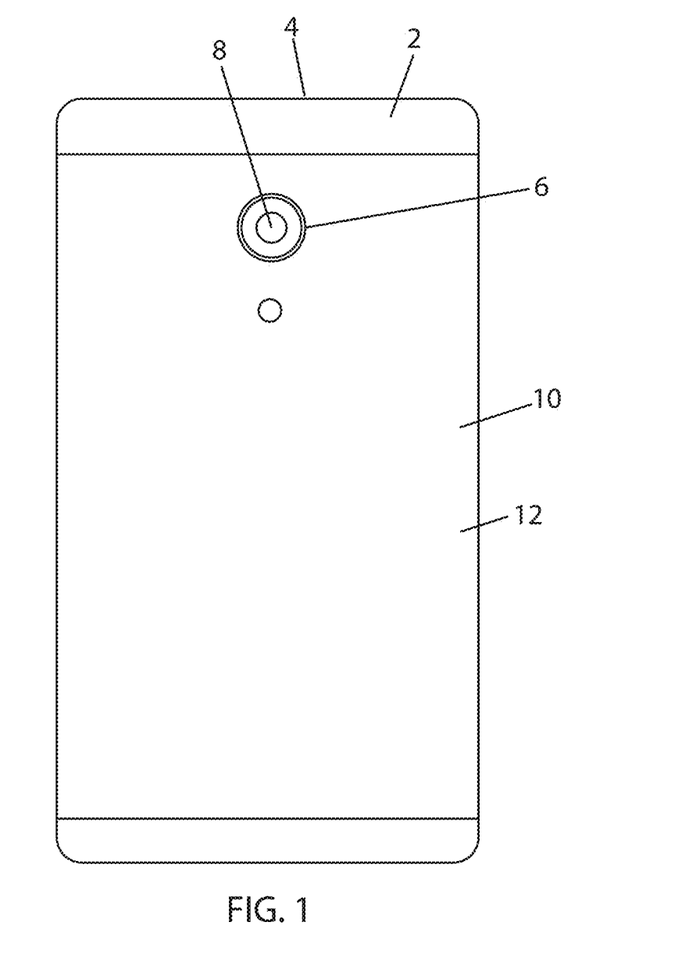
FIG. 1 shows an electronic device with a color changing cover device.

FIG. 1 illustrates a color changing cover device 10 mounted as a cover on a side 2 of an electronic device 4. The color changing cover device 10 may cover one or more openings in the side 2 of the electronic device. The electronic device 4 may be a smart phone, such as shown in FIG. 1, or another type of portable electronic device, such as a laptop or tablet. As will be explained in detail below, the color changing cover device 10 includes a translucent cover component 12 for covering a select portion of an electronic device, such as side 2 of the electronic device 4, and a backlighting component (not visible in FIG. 1; see 16, 16a, 16b, 16c, 16d, and 16e in FIGS. 2, 4, 5, 6, 7, and 9) for illuminating the translucent cover component 12 from a back surface of the translucent cover component 12. The shape of the translucent cover component 12 will depend on the part of the electronic device to be covered. In one embodiment, the material configuration of the translucent cover component 12 is such that the translucent cover component 12 appears white when not illuminated. Typically, this means that the translucent cover component 12 has at least one white surface. Typically, at least the back surface will be white, allowing the back surface to act as a diffuser. The translucency of the cover component 12 will allow light to pass through the cover component 12 while preventing detailed images of the components inside the electronic device, e.g., electronic device 4, from passing through.

The backlight component (not visible in FIG. 1; see 16, 16a, 16b, 16c, 16d, and 16e in FIGS. 2, 4, 5, 6, 7, and 9) includes a plurality of light emitting elements for providing one or more colored lights, preferably at least two colored lights, more preferably at least three colored lights for illumination of the translucent cover component 12. For example, the backlight component may provide red, green, and blue lights, which can be mixed with varying intensities to provide the translucent cover component 12 with any desired visible color. One or more of the backlights could also be in the infrared or ultraviolet portion of the spectrum for optical communications between electronics devices or for friend or foe identification. In one embodiment, the backlight component provides individually addressable colored lights with different spectral output, allowing for dynamic control of the illumination color of the translucent cover component 12. The colored lights are addressable through the controllable light emitting elements providing the colored lights. The electronic device, e.g., the electronic device 4, associated with the color changing cover device 10 can provide the control and power for the backlight component. The backlight component may use any suitable light emitting elements, e.g., colored light sources such as light-emitting diodes (LEDs), lamps, cold cathode fluorescent lamps (CCFLs), and lasers and light distributing elements such as waveguides and light diffusing fibers.

Figure 2:
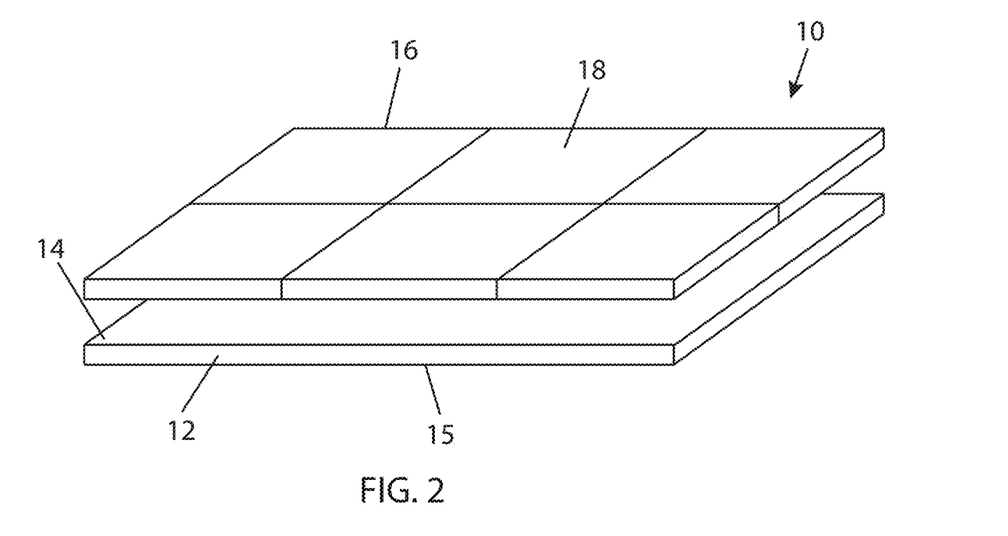
FIG. 2 shows an arrangement of a cover component and a backlight component for a color changing cover device.

FIG. 2 shows one exemplary arrangement of a translucent cover component 12 and a backlight component 16 for an embodiment of the color changing cover device. The translucent cover component 12 has a shape that will be dictated by the portion of the target electronic device to be covered. For the sake of illustration, the translucent cover component 12 is shown as having a flat shape in FIG. 2. In general, the translucent cover component 12 may have a flat, two-dimensional, shape or a three-dimensional shape, such as a shallow dish shape or a sled shape (both of these shapes have a main flat or slightly curved surface connected at the edge(s) to curved, straight, or slanted side surface(s) by rounded corner(s)). The translucent cover component 12 may also have various cutouts that are not shown in FIG. 2, as called for by the design of the electronic device. An example of such a cutout is shown at 6 in FIG. 1, where the camera lens 8 of the electronic device 4 is located.

In FIG. 2, the translucent cover component 12 has a back surface 14, which will be on the inside of the target electronic device, and a front surface 15 (in opposing relation to the back surface 14), which will be on the outside of the target electronic device. The backlight component 16 will be located inside the electronic device and in a position or configuration to illuminate the translucent cover component 12 from the back surface 14. In one embodiment, the translucent cover component 12 has a direct (or regular) transmission of less than 10%, preferably less than 1%, and a diffuse (or scattered) transmission greater than 1%, preferably greater than 5%, over a wavelength range of 390 nm to 700 nm. As has been previously discussed, the translucent cover component 12 has a white color when not illuminated, where the white color is due to the material configuration of the translucent cover component 12.

In one embodiment, the translucent cover component 12 is made from a white glass-ceramic material. For damage resistance, the white glass-ceramic material is selected from (i) a white glass-ceramic material having at least one surface under a compressive stress of at least 200 MPa and a compressively stressed layer with a depth of layer of at least 15 µm, (ii) a white glass-ceramic material having at least one surface under a compressive stress of at least 700 MPa and a compressively stressed layer with a depth of layer of at least 20 µm, and (iii) a white glass-ceramic material having a compressive stress and compressively stressed layer as in (i) or (ii) and a liquidus viscosity of greater than 50 kP, preferably greater than 100 kP, and more preferably greater than 200 kP. Examples of glass-ceramic compositions that can be chemically strengthened to have the properties described above are disclosed in, for example, U.S. patent application Ser. No. 14/038,203. The chemical strengthening process will provide the white glass-ceramic material with the required toughness to resist damage from impact with hard surfaces.

Figure 3:
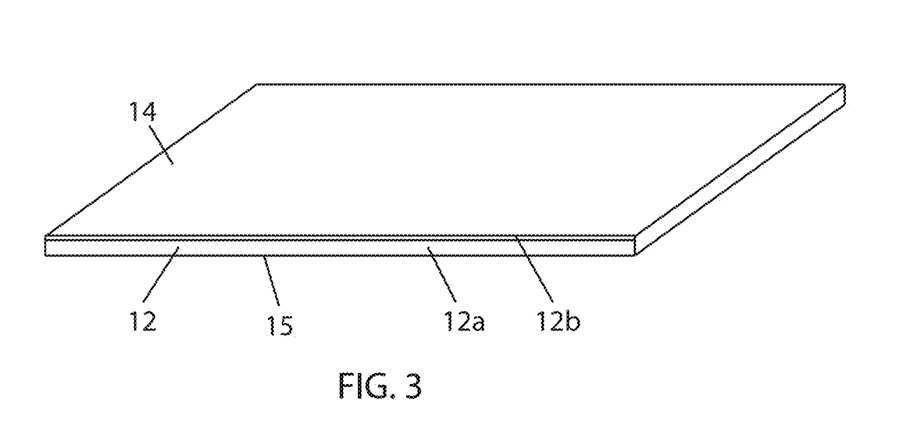
FIG. 3 shows a translucent cover component having two layers of material.

In another embodiment, the translucent cover component 12 is made of two layers of material. As shown in FIG. 3, the first layer of material 12a is a clear transparent glass, and the second layer of material 12b is a white diffusing coating. A glass may be considered to be transparent if it has a transmittance of at least 80% in a range from 390 nm to 700 nm as measured by a spectrophotometer. The white diffusing coating 12b is applied on a surface of the clear transparent glass 12a such that the white diffusing coating 12b provides the back surface 14 of the translucent cover component 12. For damage resistance, the transparent glass 12a may be selected from chemically strengthened glasses having at least one surface under a compressive stress of at least 200 MPa and a compressively stressed layer with a depth of layer of at least 15 µm. The chemically-strengthened glass may be obtained from commercial sources. For example, chemically-strengthened glass available under the trade name GORILLA® Glass from Corning Incorporated may be used as the transparent glass.

In yet another embodiment, the translucent cover component 12 may be made of a white polymer or other material or structure having the translucency, transmission, and color properties described above for the translucent cover component 12.

In FIG. 2, the backlight component 16 has a color array 18 arranged in opposing relation to the back surface 14 of the translucent cover component 12. A color array is an array of different colored light sources or light emitting elements. The light sources or light emitting elements could be, for example, LEDs, lasers, or color filters. In one embodiment, color array 18 includes at least light emitting elements (or light sources) providing red, blue, and green lights. In one example, the color array 18 includes colored light filters. The filters will modify the colors of the light transmitted through them to the back surface 14 of the translucent cover component 12. The light passing through the filters may be ambient light, e.g., the light used to illuminate the screen of the electronic device, or may be provided by a separate light source (not shown). The back surface 14 will act as a diffuser for the colored lights it receives, spreading and mixing the colored lights to provide the translucent cover component 12 with the desired illumination color or color pattern. The back surface 14 can also have an opaque pattern to mask portions so the color is only illuminated in the shape of a logo, button, feature, writing, or inverse thereof.

Figure 4:
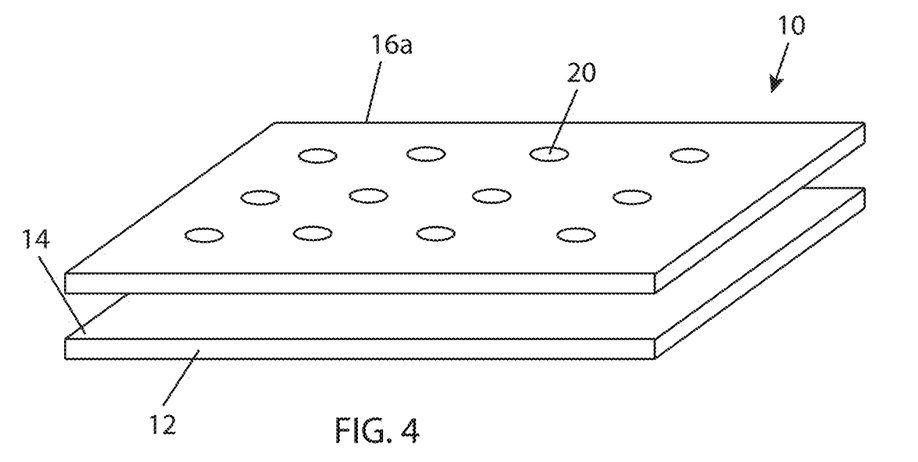
FIG. 4 shows illumination of the translucent cover component with an array of light sources in a direct-lit configuration.

FIG. 4 shows another exemplary arrangement of the translucent cover component 12, as described above, and a backlight component 16a for another embodiment of the color changing cover device. In FIG. 4, the backlight component 16a includes an array of colored light sources 20 arranged in opposing relation to the back surface 14 of the translucent cover component 12. The colored light sources 20 are shown as LEDs, although other types of colored light sources may be used. The array of colored light sources 20 may contain red, blue, and green light sources as well as light sources with other colors or wavelengths outside of the visible portion of the spectrum. The back surface 14 will diffuse the colored lights it receives from the light sources 20 to provide the translucent cover component 12 with the desired illumination color or color pattern.

Figure 5:
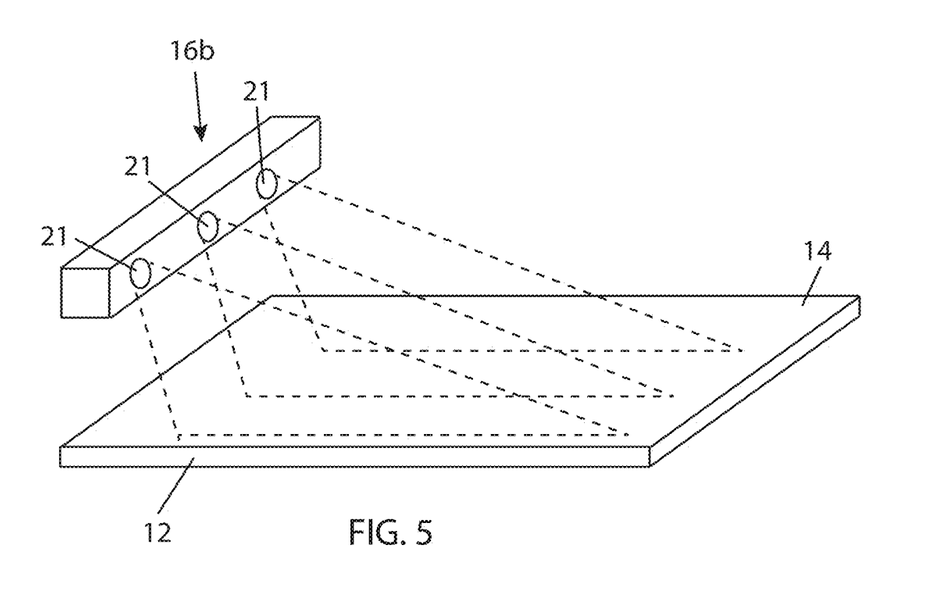
FIG. 5 shows illumination of the translucent cover component with light sources in a side-lit configuration.

FIG. 5 shows an arrangement of the translucent cover component 12, as described above, and a backlight component 16b. In FIG. 5, the backlight component 16b includes colored light sources 21 arranged to project colored lights to the back surface 14 from a position at or near an edge of the translucent cover component 12. The colored light sources 21 may be LEDs, although other types of colored light sources may be used. The back surface 14 can be frosted, etched, coated or roughened to increase the ratio of diffuse to direct transmission without significantly decreasing the total transmission.

Figure 6:
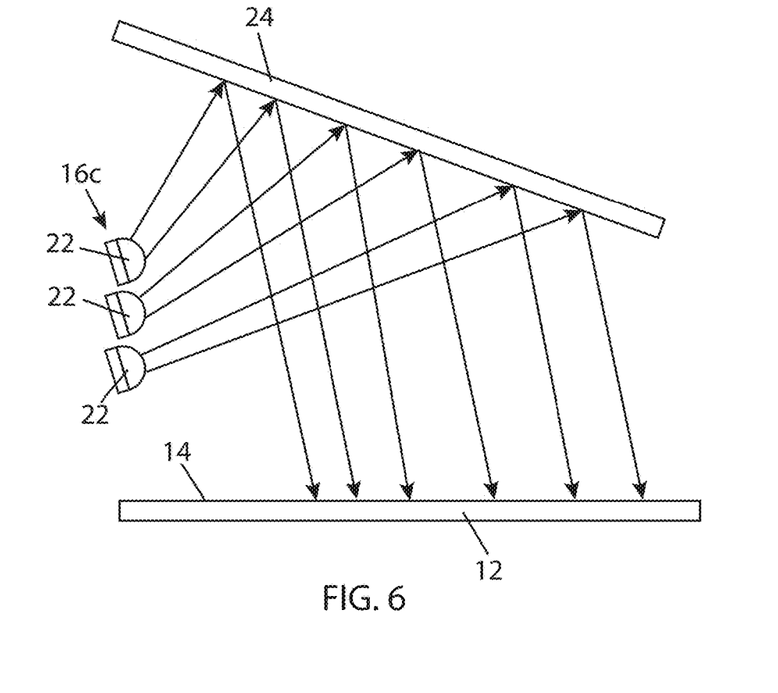
FIG. 6 shows illumination of the translucent cover component via a reflective surface and light sources.

FIG. 6 shows an arrangement of the translucent cover component 12, as described above, and a backlight component 16c. In FIG. 6, the backlight component 16c includes colored light sources 22 arranged to project colored lights to a reflective surface 24, such as a mirror. The reflective surface 24 is arranged to redirect the colored lights received from the colored light sources 22 to the back surface 14 of the translucent cover component 12. The mirror enables a thinner device with side illumination, and longer path length for color beam intermixing. The colored light sources 22 may be LEDs, although other types of colored light sources may be used. Furthermore, the reflecting surface 24 can be scattering to diffuse the image of the light sources and prevent "hot spots" or images of the light sources on the translucent cover component 12.

Figure 7:
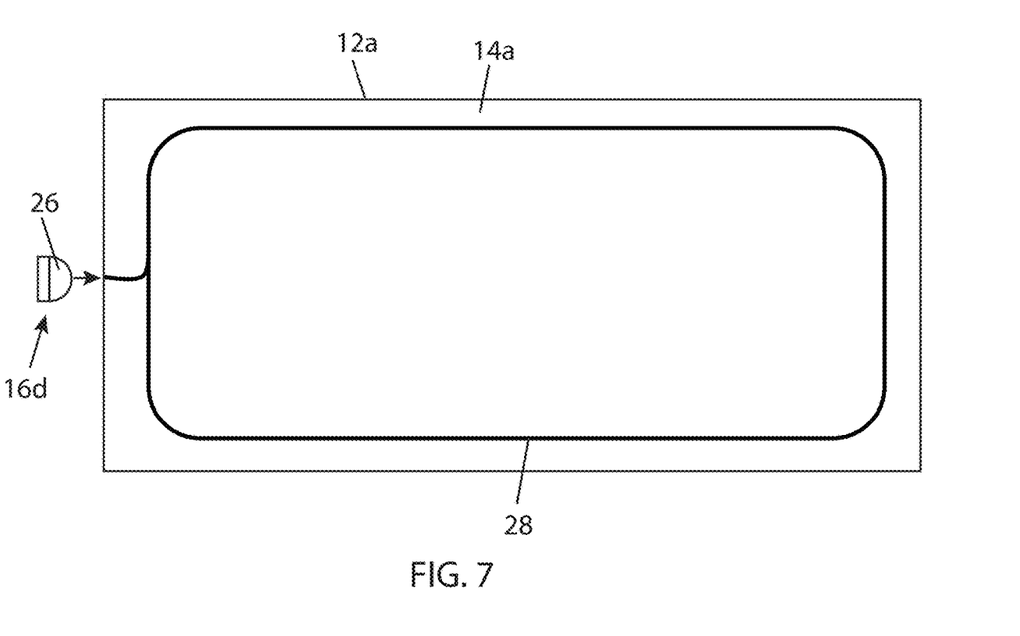
FIG. 7 shows a waveguide embedded in the translucent cover component for distribution of light.
Figure 8:
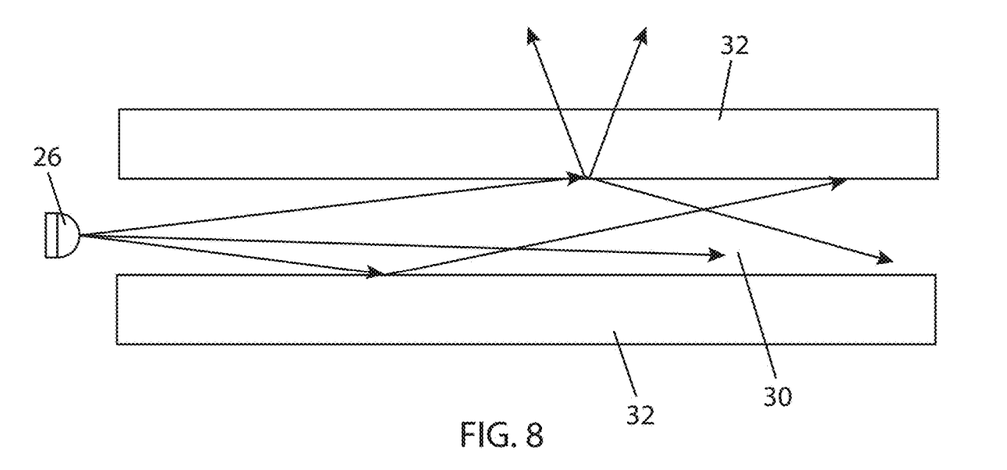
FIG. 8 shows a waveguide structure.

FIG. 7 shows an arrangement of a translucent cover component 12a and a backlight component 16d for another embodiment of the color changing cover device. The translucent cover component 12a differs from the translucent cover component 12 described above mainly in that it includes a patterned or embedded waveguide 28 in its back surface 14a. As shown in FIG. 8, the waveguide 28 includes a core 30 made of high index clear material and a cladding 32 surrounding the core 30 and made of low index light diffusing material. Light is projected from the colored light source 26 into the core 30 and scattered by the cladding 32 into the surrounding material of the translucent cover component 12a (in FIG. 7). The glow of light will be seen on the translucent cover component 12a according to the pattern of the waveguide 28. Thus the waveguide pattern may be selected based on a desired image to be displayed on the translucent cover component 12a when the translucent cover component 12a is illuminated.

Returning to FIG. 7, the backlight component 16d may have more than one colored light source 26. Multiple colored light sources 26 may project light into the core of a single waveguide 28. Alternatively, the colored lights from the multiple colored light sources may be mixed prior to being projected into the core of the single waveguide 28. Alternatively, multiple waveguides 28 may be patterned or embedded in the back surface 14a, and each waveguide may receive colored light from one of the multiple colored light sources.

Figure 9:
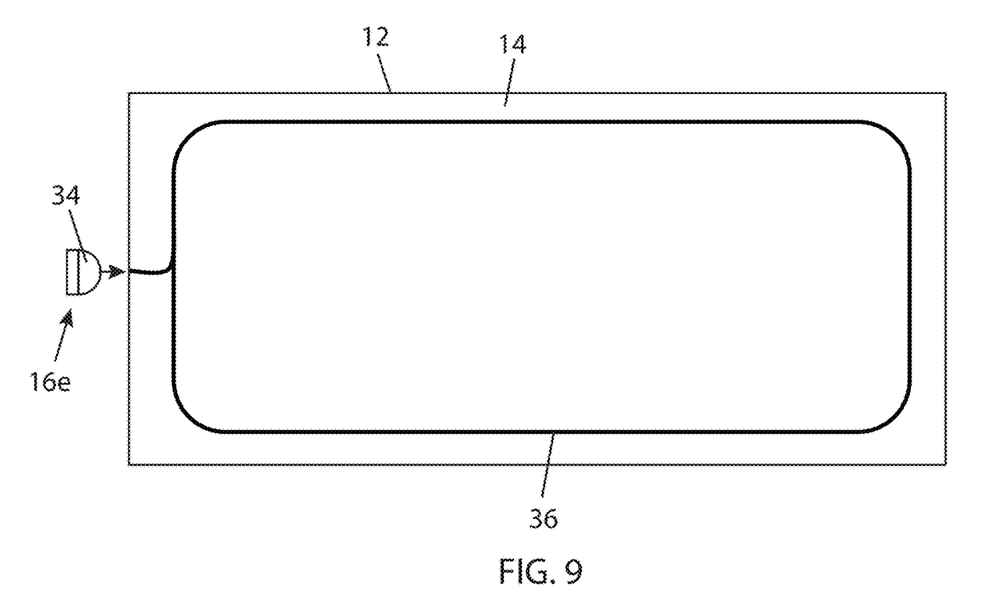
FIG. 9 shows a light diffusing fiber arranged on the translucent cover component for distribution of light.

FIG. 9 shows an arrangement of the translucent cover component 12, as described above, and a backlight component 16e. In FIG. 9, a light diffusing fiber 36 is arranged on the back surface 14 of the translucent cover component 12. The backlight component 16e includes a colored light source 34 arranged to project light into the light diffusing fiber 36. The colored light source 34 may be a LED or laser or other type of colored light source. The light diffusing fiber 36 will scatter the light it receives into the surrounding material of the translucent cover component 12. The backlight component 16e may have more than one colored light source 34, particularly if the backlight component 16e is to provide at least two colored lights. Multiple colored lights may be coupled to a single light diffusing fiber 36. Alternatively, multiple light diffusing fibers 36 may be arranged on the back surface 14, with each light diffusing fiber 36 receiving colored light from one of the multiple colored light sources. The light diffusing fiber(s) 36 may be arranged in a desired pattern on the back surface 14 to form a desired image on the translucent cover component 12 when the translucent cover component 12 is illuminated.

Other scattering patterns may be formed on, or embedded in, the back surface 14 of the translucent cover component 12 (12a) besides the ones shown in FIGS. 7 and 9.

The color changing cover device 10 described above will enable an electronic device whose color can be dynamically changed. In the unpowered state, the translucent cover component 12 (12a) will appear white and opaque. In the powered state, the color of the translucent cover component 12 (12a) can be changed via the backlight component 16 (16a, 16b, 16c, 16d, 16e). The control of the backlight component can be achieved through the electronic device. For example, the user of the electronic device could set the desired color for the cover through a menu displayed on a screen of the electronic device. The electronic device will then control the intensities of the light sources in the backlight component 16 (16a, 16b, 16c, 16d, 16e) to provide the desired illumination color to the translucent cover component 12 (12a). The translucent cover component 12 (12a) can be illuminated with a solid color or gradient color or a colored image or pattern. For example, light sources in the backlight component 16 (16a, 16b, 16c, 16d, 16e) can be arranged in a predetermined pattern and individually controlled to illuminate the translucent cover component 12 with a predetermined image or pattern. Waveguides embedded in the translucent cover component 12 (12a) or patterned illumination arrays can also be used to create illuminated images in the translucent cover component 12 (12a).

Polymer-based covers scratch easily, whereas hard glass or glass-ceramic covers are more resistant to surface scratching. If the glass or glass-ceramic cover is ion exchanged with a compressive stress of more than 200 MPa and a depth of layer greater than 15 microns, the glass or glass-ceramic cover will have improved damage resistance and retained strength after use. Table I below lists some exemplary glass-ceramics that are well suited for making the translucent cover component 12 (12a).

TABLE I

| Glass Code | $SiO_2$ | $Al_2O_3$ | $B_2O_3$ | $P_2O_5$ | $Na_2O$ | $K_2O$ |
|---|---|---|---|---|---|---|
| 519HFF | 61.07 | 14.90 | 0.50 | 5.25 | 13.92 | 0.51 |
| 519HFG | 60.28 | 14.99 | 0.35 | 5.82 | 14.33 | 0.50 |
| 519HFH | 59.65 | 15.01 | 0.19 | 6.37 | 14.69 | 0.49 |
| 519HFI | 59.01 | 15.03 | 0.03 | 6.93 | 15.05 | 0.49 |
| 519HFK | 58.45 | 14.98 | 0.03 | 7.38 | 15.36 | 0.48 |
| 519HFM | 58.37 | 14.97 | 0.03 | 7.40 | 15.43 | 0.48 |
| 519HFN | 58.18 | 15.11 | 0.03 | 7.39 | 15.47 | 0.48 |
| 519HFT | 58.31 | 15.00 | 0.03 | 7.43 | 15.43 | 0.48 |
| 519HFU | 58.32 | 15.06 | 0.03 | 7.47 | 15.37 | 0.47 |
| 519HFX | 58.24 | 14.95 | 0.03 | 7.51 | 15.35 | 0.48 |
| 519HFZ | 58.19 | 14.63 | 0.03 | 7.50 | 15.06 | 0.48 |
| 519HGC | 58.48 | 14.51 | 0.03 | 7.45 | 14.87 | 0.47 |
| 519HGF | 58.44 | 14.51 | 0.03 | 7.49 | 14.84 | 0.48 |
| 519HGJ | 58.40 | 14.48 | 0.03 | 7.47 | 14.90 | 0.48 |
| 519HGK | 57.85 | 14.68 | 0.03 | 7.59 | 14.95 | 0.50 |
| 519HGQ | 58.41 | 14.43 | 0.03 | 7.44 | 14.87 | 0.48 |
| 519HGS | 58.21 | 14.50 | 0.03 | 7.50 | 14.92 | 0.48 |
| 519HGV | 58.45 | 14.41 | 0.03 | 8.39 | 14.87 | 0.49 |
| 519HGX | 58.20 | 14.57 | 0.03 | 8.45 | 14.93 | 0.49 |
| 519HHA | 58.28 | 14.56 | 0.03 | 8.47 | 14.84 | 0.48 |
| 519HHD | 58.21 | 14.55 | 0.03 | 8.47 | 14.94 | 0.48 |
| 519HHH | 58.04 | 14.64 | 0.03 | 8.31 | 14.97 | 0.48 |
| 519HHJ | 58.29 | 14.46 | 0.03 | 8.03 | 15.02 | 0.48 |
| 519HHM | 58.54 | 14.55 | 0.03 | 7.91 | 14.74 | 0.48 |
| 519HHO | 58.40 | 14.59 | 0.03 | 7.71 | 14.79 | 0.48 |
| 519HHR | 58.42 | 14.54 | 0.03 | 7.64 | 14.83 | 0.50 |
| 519HHT | 58.37 | 14.60 | 0.03 | 7.63 | 14.83 | 0.49 |

| Glass Code | MgO | CaO | $SnO_2$ | $ZrO_2$ | $TiO_2$ |
|---|---|---|---|---|---|
| 519HFF | 1.63 | 0.04 | 0.10 | 0.02 | 2.04 |
| 519HFG | 1.32 | 0.04 | 0.11 | 0.03 | 2.23 |
| 519HFH | 1.02 | 0.04 | 0.10 | 0.03 | 2.40 |
| 519HFI | 0.71 | 0.03 | 0.09 | 0.03 | 2.58 |
| 519HFK | 0.46 | 0.03 | 0.07 | 0.04 | 2.70 |

TABLE I-continued

| | | | | | |
|---|---|---|---|---|---|
| 519HFM | 0.43 | 0.04 | 0.08 | 0.05 | 2.71 |
| 519HFN | 0.45 | 0.04 | 0.08 | 0.05 | 2.71 |
| 519HFT | 0.44 | 0.03 | 0.07 | 0.04 | 2.72 |
| 519HFU | 0.43 | 0.02 | 0.07 | 0.04 | 2.70 |
| 519HFX | 0.58 | 0.02 | 0.07 | 0.04 | 2.70 |
| 519HFZ | 1.27 | 0.02 | 0.07 | 0.04 | 2.71 |
| 519HGC | 1.40 | 0.03 | 0.06 | 0.04 | 2.65 |
| 519HGF | 1.42 | 0.03 | 0.06 | 0.04 | 2.66 |
| 519HGJ | 1.43 | 0.03 | 0.06 | 0.04 | 2.66 |
| 519HGK | 1.47 | 0.03 | 0.07 | 0.04 | 2.78 |
| 519HGQ | 1.42 | 0.03 | 0.07 | 0.04 | 2.77 |
| 519HGS | 1.41 | 0.03 | 0.07 | 0.04 | 2.80 |
| 519HGV | 0.50 | 0.03 | 0.07 | 0.04 | 2.72 |
| 519HGX | 0.45 | 0.03 | 0.08 | 0.05 | 2.73 |
| 519HHA | 0.44 | 0.06 | 0.07 | 0.05 | 2.73 |
| 519HHD | 0.43 | 0.04 | 0.07 | 0.05 | 2.73 |
| 519HHH | 0.43 | 0.03 | 0.07 | 0.05 | 2.94 |
| 519HHJ | 0.44 | 0.05 | 0.08 | 0.05 | 3.07 |
| 519HHM | 0.42 | 0.04 | 0.07 | 0.04 | 3.18 |
| 519HHO | 0.43 | 0.05 | 0.07 | 0.04 | 3.41 |
| 519HHR | 0.43 | 0.05 | 0.07 | 0.05 | 3.44 |
| 519HHT | 0.42 | 0.04 | 0.07 | 0.04 | 3.47 |

To minimize visibility of components behind the translucent cover component 12 (12a), it is desirable for the translucent cover component 12 (12a) to have a low direct transmission. However, it is also desirable to let as much of the backlight through the translucent cover component 12 (12a) as possible to maximize efficiency and minimize power consumption for a given brightness, so a high diffuse transmission is required. In general, the translucent cover component 12 (12a) needs to have less than 10% direct transmission to prevent viewing of the device interior. Also, a direct transmission of less than 5% is needed to obscure the interior in bright ambient conditions such as sunlight, while a direct transmission of less than 2% is most desirable for obscuring the interior even when backlit. For high efficiency, the diffuse transmission should be greater than 2% and more preferably greater than 5% to decrease power consumption, and most preferably the diffuse transmission should exceed 10% for optimal device brightness and battery life.

Figure 10:
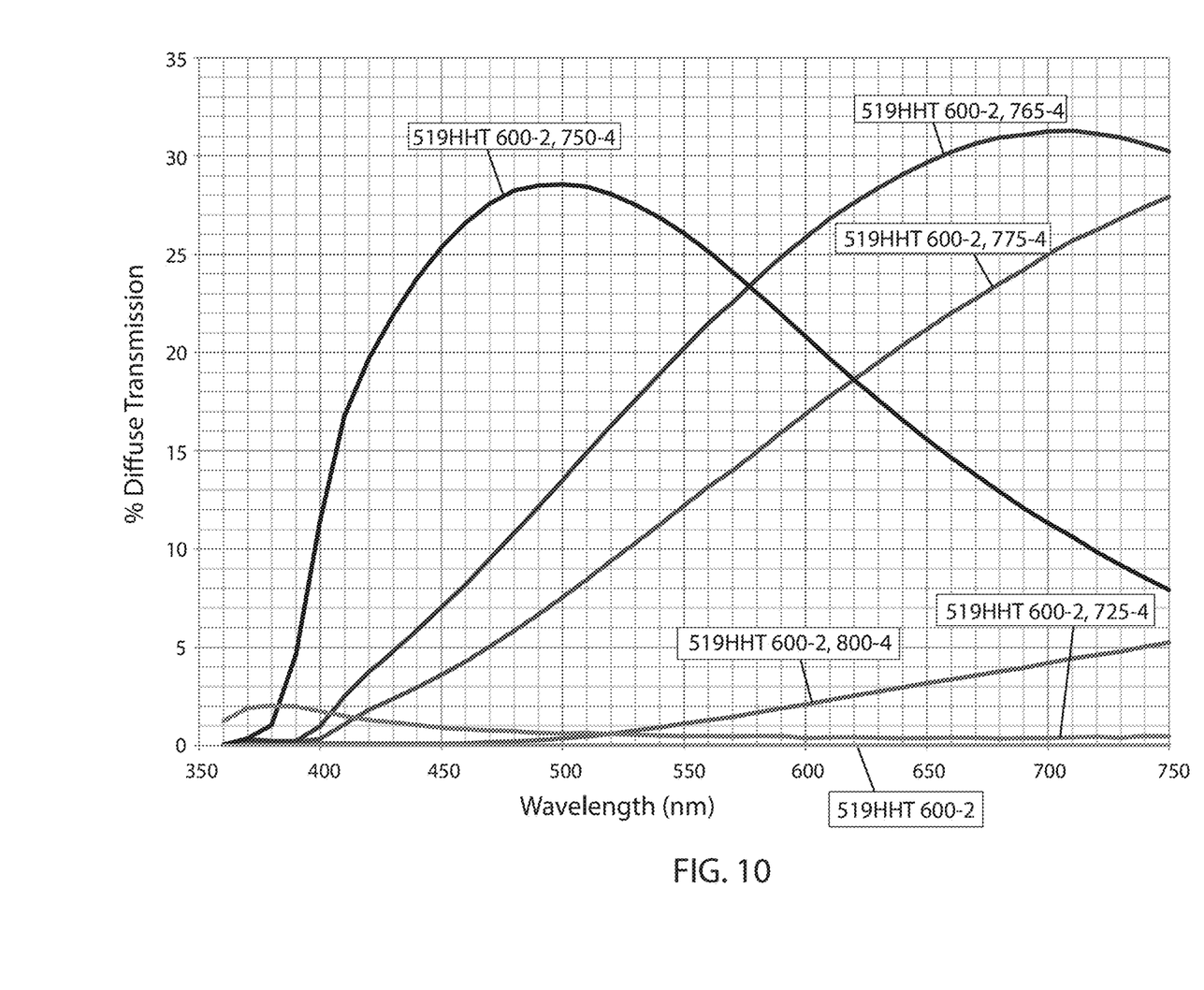
FIG. 10 shows diffuse transmission of various heat treatments of composition 519HHT.
Figure 11:
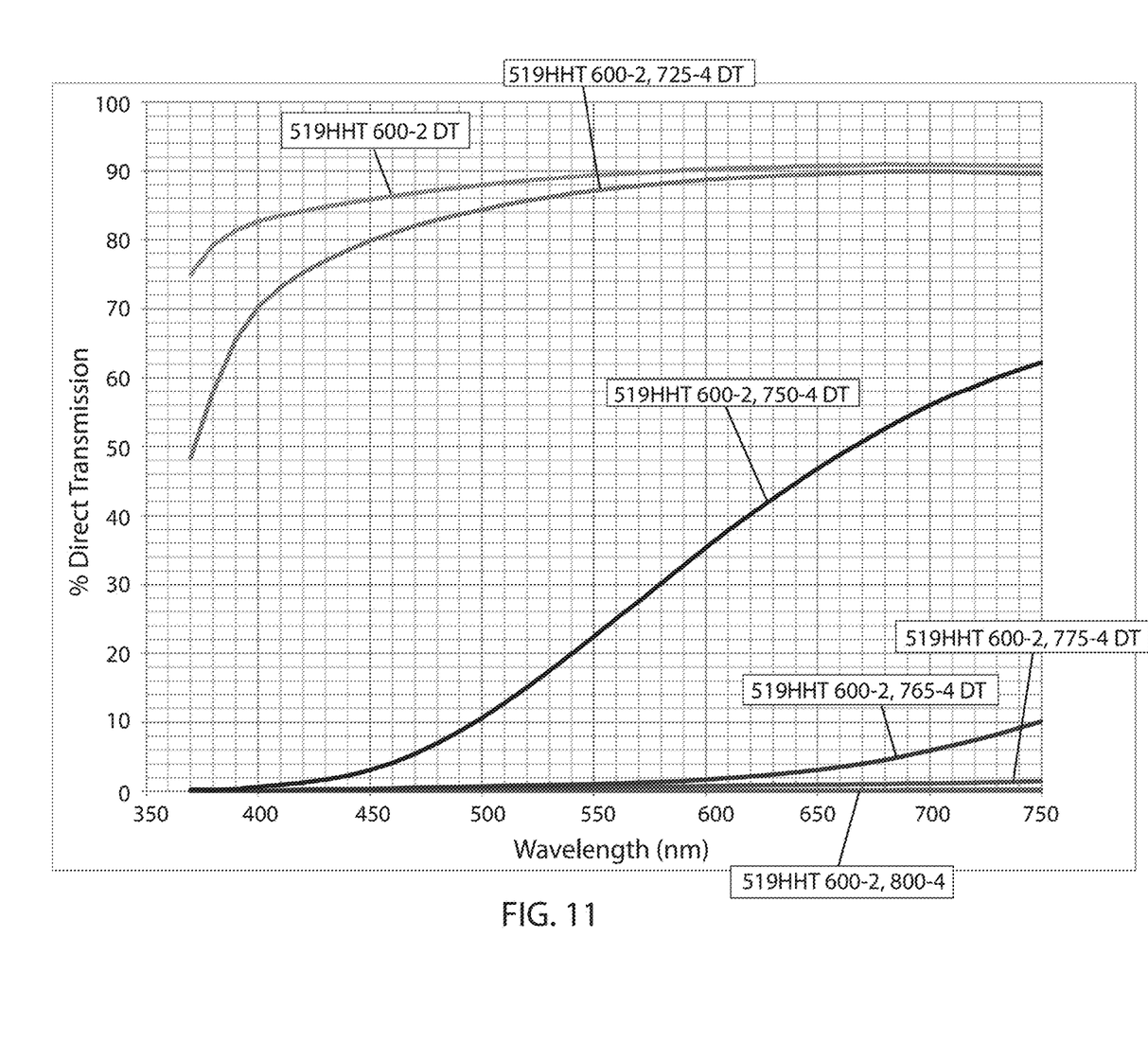
FIG. 11 shows direct transmission of various heat treatments of composition 519HHT.
Figure 12:
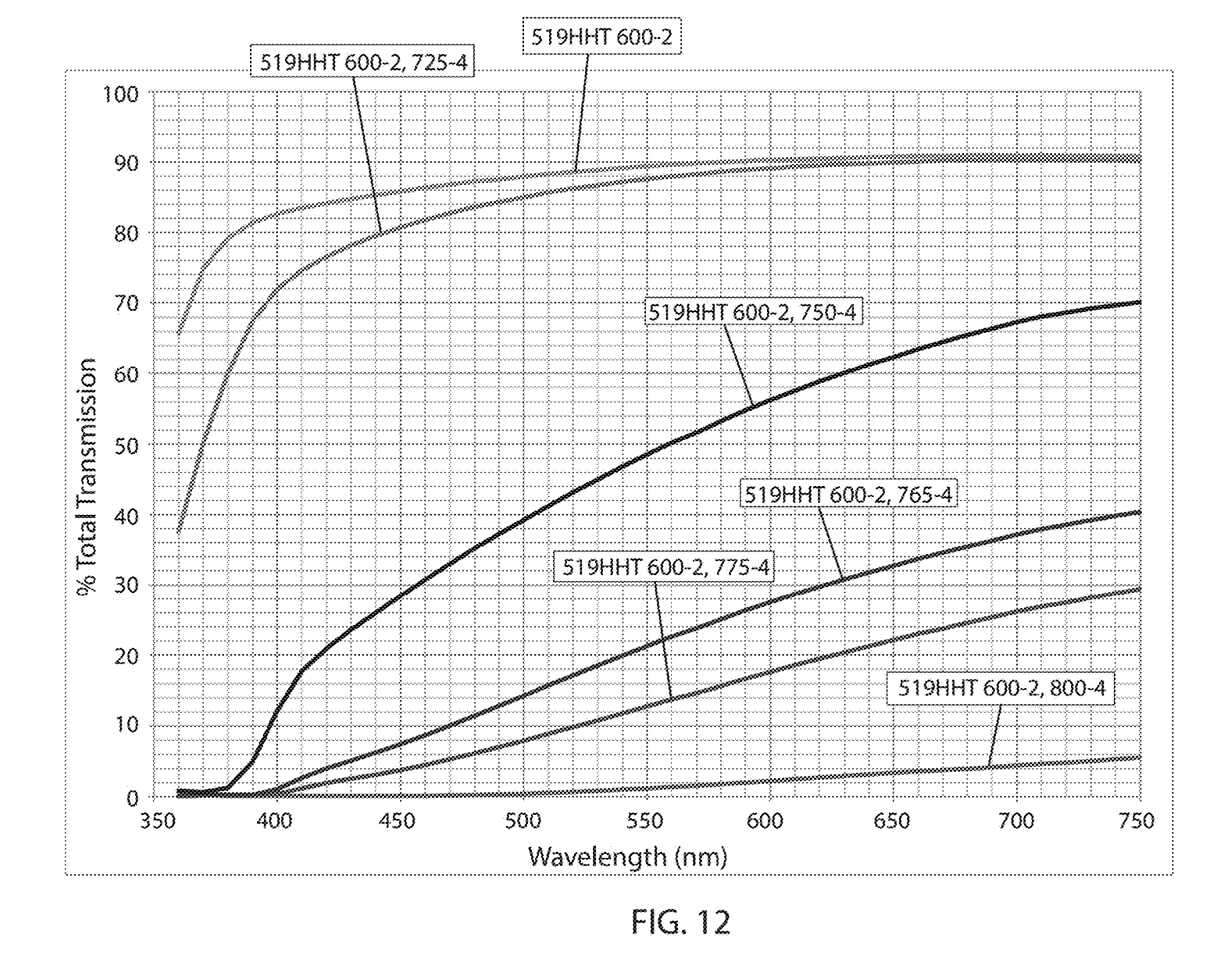
FIG. 12 shows total transmission of various heat treatments of composition 519HHT.

The diffuse and direct transmission curves for composition 519HHT heat treated under various conditions are illustrated in FIGS. 10 and 11. To understand the annotation used in FIGS. 10 and 11, the legend "519HHT 600-2, 750-4," for example, means that composition 519HHT was cerammed at 600° C. for 2 hours followed by at 750° C. for 4 hours. While composition 519HHT cerammed at 600° C. for 2 hours alone or followed by at 725° C. for 4 hours exhibits more than 70% transmission across the visible spectrum for high efficiency, it has very little scatter, so nearly all of the total transmission is direct and the cover will not obscure objects behind it. Both of these examples exhibit less than 2% diffuse transmission and are therefore not effective covers for obscuring the device interior. When composition 519HHT is cerammed at 600° C. for 2 hours followed by at 750° C. for 4 hours the direct transmission falls to less than 60%. When the peak ceram temperature is increased to 765° C., the direct transmission is less than 10% across the visible portion of the spectrum, and the material obscures objects behind it while still allowing more than 20% diffuse transmission. Composition 519HHT cerammed at 600° C. for 2 hours followed by at 775° C. for 4 hours has less than 1% direct transmission yet still exhibits more than 10% diffuse transmission over most of the visible portion of the spectrum and more than 20% diffuse transmission over the red portion of the spectrum. The ideal material will exhibit more diffuse transmission than direct, and this ratio can be increased by sandblasting, frosting, coating, etching, or otherwise roughening the surface 14 of the cover 12 to further increase the ratio of diffuse to direct transmission. In one embodiment, this ratio may be greater than 1. In another embodiment, this ratio may be greater than 2.

Finally, it is desirable to have as broad a color palette as possible, so a neutral white cover is ideal. In general, the D65 reflected color coordinates L*, a* and b* should be within the following limits: $80 \leq L^* \leq 100$, $-5 \leq a^* 5$, and $-5 \leq b^* \leq 5$. A larger color palette is achievable when $85 \leq L^* \leq 100$, $-\leq 3a^* \leq 3$, and $-3 \leq b^* \leq 4$.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An article, comprising:
a translucent cover component appearing white when not illuminated, the translucent cover component having a direct transmission of less than 10% over a wavelength range of 390 nm to 700 nm and a diffuse transmission of 1% or greater over a wavelength range of 390 nm to 700 nm; and
a backlight component arranged to illuminate the translucent cover component from a back surface of the translucent cover component, the backlight component being configured to provide at least two individually addressable colored lights with different spectral output.

2. The article of claim 1, wherein the direct transmission is less than 5% over a wavelength range of 390 nm to 700 nm.

3. The article of claim 1, wherein the diffuse transmission is greater than 2% over a wavelength range of 390 nm to 700 nm.

4. The article of claim 1, wherein the ratio of the diffuse transmission to the direct transmission is greater than 1.

5. The article of claim 1, wherein the ratio of the diffuse transmission to the direct transmission is greater than 2.

6. The article of claim 1, wherein the color presented in CIELAB color space coordinates for CIR illuminant D65 determined from reflectance spectra measurements using a spectrophotometer of the translucent cover component are within $80 \leq L^* \leq 100$, $-5 \leq a^* \leq 5$, and $-5 \leq b^* \leq 5$.

7. The article of claim 1, wherein the color presented in CIELAB color space coordinates for CIR illuminant D65 determined from reflectance spectra measurements using a spectrophotometer of the translucent cover component are within $85 \leq L^* \leq 100$, $-3 \leq a^* \leq 3$, and $-3 \leq b^* \leq 4$.

8. The article of claim 1, wherein the translucent cover component comprises a white glass-ceramic material.

9. The article of claim 8, wherein the white glass-ceramic material has at least one surface under a compressive stress of at least 200 MPa and a compressively stressed layer having a depth of layer of at least 15 μm.

10. The article of claim 8, wherein the white glass-ceramic material has a liquidus viscosity of greater than 50 kP.

11. The article of claim 1, wherein the translucent cover component comprises a transparent glass and a white diffusing coating applied on a surface of the transparent glass, wherein the white diffusing coating is located at the back surface of the translucent cover component.

12. The article of claim 11, wherein the transparent glass has at least one surface under a compressive stress of at least 200 MPa and a compressively stressed layer having a depth of at least 15 μm.

13. The article of claim 1, wherein the backlight component comprises a color array positioned in opposing relation to the back surface of the translucent cover component.

14. The article of claim 1, wherein the backlight component comprises an array of colored light sources positioned in opposing relation to the back surface of the translucent cover component.

15. The article of claim 1, wherein the backlight component comprises a plurality of colored light sources arranged to project colored lights to the back surface of the translucent cover component from a position at or near an edge of the translucent cover component.

16. The article of claim 1, wherein the backlight component comprises a plurality of colored light sources arranged to project colored lights to a reflective surface, wherein the reflective surface is arranged to redirect the colored lights received from the colored light sources to the back surface of the translucent cover component.

17. The article of claim 1, further comprising at least one waveguide embedded in the back surface of the translucent cover component to receive at least one of the colored lights and distribute the at least one of the colored lights to a surrounding material of the translucent cover component.

18. The article of claim 1, further comprising at least one light diffusing fiber arranged proximate the back surface of the translucent cover component to receive at least one of the colored lights and distribute the at least one of the colored lights to a surrounding material of the translucent cover component.

19. The article of claim 1, wherein the backlight component comprises a plurality of light emitting diodes or lasers.

20. The article of claim 1, wherein the back surface is roughened such that the translucent cover component exhibits more diffuse transmission than direct transmission over a wavelength range of 390 nm to 700 nm.

* * * * *

UNITED STATES PATENT AND TRADEMARK OFFICE
CERTIFICATE OF CORRECTION

PATENT NO. : 10,612,768 B2
APPLICATION NO. : 16/266665
DATED : April 7, 2020
INVENTOR(S) : Matthew John Dejneka Page 1 of 1

It is certified that error appears in the above-identified patent and that said Letters Patent is hereby corrected as shown below:

On the Title Page

On page 2, in Column 2, item (56), Foreign Patent Documents, Line 7, delete "2010134926" and insert -- 20100134926 --, therefor.

Signed and Sealed this
Fifteenth Day of September, 2020

Andrei Iancu
*Director of the United States Patent and Trademark Office*